(12) United States Patent
Ye

(10) Patent No.: US 9,200,724 B2
(45) Date of Patent: Dec. 1, 2015

(54) BATHTUB FAUCET WATER SWITCHING STRUCTURE

(71) Applicant: Xiamen Runner Industrial Corporation, Xiamen (CN)

(72) Inventor: Wen-Hua Ye, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 89 days.

(21) Appl. No.: 14/072,145

(22) Filed: Nov. 5, 2013

(65) Prior Publication Data

US 2014/0374636 A1    Dec. 25, 2014

(30) Foreign Application Priority Data

Jun. 20, 2013   (CN) .................... 2013 2 0354875 U

(51) Int. Cl.
*F16K 31/60* (2006.01)
*F16K 1/00* (2006.01)

(52) U.S. Cl.
CPC . *F16K 31/60* (2013.01); *F16K 1/00* (2013.01); *F16K 31/602* (2013.01)

(58) Field of Classification Search
CPC ......... F16K 31/60; F16K 31/602; F16K 1/00; E03C 1/04; E03C 1/0404; E03C 2001/026; E03C 2201/30

USPC ................ 251/279, 240–241, 245–246, 263; 4/678

See application file for complete search history.

(56) References Cited

U.S. PATENT DOCUMENTS

| 415,521 | A | * | 11/1889 | Lansbert | ...................... 251/241 |
| 935,268 | A | * | 9/1909 | Levedahl | ...................... 251/240 |
| 958,735 | A | * | 5/1910 | Ericson | .......................... 251/110 |

\* cited by examiner

*Primary Examiner* — Marina Tietjen
(74) *Attorney, Agent, or Firm* — Chun-Ming Shih

(57) ABSTRACT

A bathtub faucet water switching structure includes: a hollow water passage body with a water inlet and a water outlet; a switching lever longitudinally installed at the front of the water passage body and having an upper end protruded from the faucet body and a lower end linked with the center bolt; and a center bolt movably installed to the water outlet and having first and second shaft portions, and a water stop plate installed between the first and second shaft portions. The first shaft portion is corresponsive to the lower end of switching lever, and a spring is sheathed on the second shaft portion, and the center bolt is moved horizontally back and forth in the water passage body by the action of the switching lever and spring to drive the water stop plate and water outlet hole to connect or disconnect a water path.

8 Claims, 5 Drawing Sheets

BATHTUB FAUCET WATER SWITCHING STRUCTURE

BACKGROUND OF THE INVENTION

1. Field of Invention

The present invention relates to a bathtub faucet, and particularly to a water switching structure of the faucet.

2. Description of Related Art

In general, a bathtub faucet has two water output paths communicated with two water outlets to provide two different ways of outputting water. One way is to fill water into a bathtub, and the other way is to supply water to a shower head (including a handheld shower head). Both require a switching valve for switching the way of outputting water. At present, most switching valves applied in the bathtub faucet are knob or uplifting switching valves for the control of switching, but the switching valves of this sort have the following shortcomings.

After the water valve is shut, the switching valve is still maintained at the switching status, so that when the water valve is opened again, the next user has no way to know about the switching status or determine whether the water will be outputted into the bathtub or from the shower head after the water valve is opened. Obviously, such application is inconvenient. If the sealing effect of a sealing washer used in the water path for back-pressure sealing is poor, a complete water stop effect cannot be achieved, and there will be leakages in water paths, and the switching effect between the water paths will be uncertain.

If a knob is used for the switching, the operation of the knob with water is relatively more laborious and slips easily. On the other hand, if a lifting rod is used for the switching, it is necessary to overcome the resistance in the valve to pull out the lifting rod, and thus it is also laborious.

It is noteworthy that the conventional structure also comes with an automatic restoring function, but the position restoration of the conventional structure is relatively slow. In summation, the present invention has the following advantages:

1. The invention can seal water completely and thus having no leakage issue.
2. The invention can achieve a low-pressure switching. At present, the manual mode can achieve the switching as low as 5 psi (or less, if the spring is adjusted appropriately).
3. The lifting rod requires users to grip by fingers, but the present invention allows users to achieve the switching operation by a touch of any part of the user's body or a touch of any object.
4. The spring can resume its original position reliably and quickly.
5. To resume the original position of the lifting rod, the handle is generally made of metal, but the handle of the structure of the present invention can be made of metal or plastic (particularly if the handle is an allotype, the metal component is more expensive, and the costs of internal parts are more or less the same, so that the cost of the handle of the invention is more competitive).
6. The present invention has a simpler structural design without any leakage issue and is capable of achieving the required water flow and splash more easily.

SUMMARY OF THE INVENTION

In view of the shortcomings of the use of the conventional bathtub faucet, it is a primary objective of the present invention to provide a center-bolt bathtub faucet water switching structure capable of resuming the switching structure to its initial status after the faucet inlet valve is shut.

To achieve the foregoing objectives, the present invention provides a bathtub faucet water switching structure installed in a faucet body, comprising: a water passage body, a switching lever and a center bolt, characterized in that the water passage body is a hollow structure with both penetrating ends and has a water inlet hole and a water outlet hole; the switching lever, which is a lever primarily switched by rotating with respect to a certain fulcrum, or secondarily lifted without involving any fulcrum, and the switching lever is longitudinally installed at the front end of the water passage body and has an upper end protruded out of the faucet body and a lower end linked with the center bolt; and the center bolt is transversally and movably installed to the water outlet of water passage body and has a first shaft portion and a second shaft portion, and a water stop plate is installed between the first shaft portion and the second shaft portion, and the first shaft portion of the center bolt is corresponsive to the lower end of switching lever, and a spring is sheathed on the shaft body of the second shaft portion, and the center bolt is moved horizontally back and forth in the water passage body by the action of the switching lever and the spring to drive the water stop plate and the water outlet hole to connect or disconnect a water path.

The water passage body includes a fixing based formed at the front end of the water passage body for receiving the switching lever, and a mounting hole is formed at the middle of the fixing base, and a ball portion is formed on the switching lever and rotatably contained within the mounting hole.

The water passage body includes a fixing cover mounted onto an opening of the water outlet hole, and the fixing cover has an open receiving cavity formed at the middle of the fixing cover and facing the water outlet hole, and the receiving cavity has a through hole formed on a sidewall of the receiving cavity and communicated with a hollow portion of the receiving cavity, and the second shaft portion of the center bolt is extended into the receiving cavity of the fixing cover and protruded out of the through hole.

The first shaft portion the center bolt has a plug hole formed thereon, and the lower end of the switching lever is extended into the plug hole.

The second shaft portion of the center bolt has a bracket for fixing the spring.

The first shaft portion of center bolt is a tilted slot, and the lower end of the switching lever is extended into the tilted slot, and the lower end of the switching lever has a latch button.

The switching lever includes a cylindrical body formed thereon and contained in a mounting hole of a fixing base of the water passage body.

The first shaft portion of the center bolt includes two separating level cantilevers, and a pivot is installed between the two cantilevers, and the lower end of the switching lever has a fork corresponding to the pivot.

In the aforementioned structure, the center bolt is transversally installed (in the same direction of the water flow) to the water outlet of the water passage body of the faucet, and the center bolt can be moved horizontally back and forth in the water passage body by the action of the switching lever and the spring to drive the water stop plate of the center bolt and the water outlet hole to connect or disconnect water path, and such structure has a good sealing effect for preventing leakage, so that the water paths can be switched more definitely. After the faucet inlet valve is shut, the center bolt is driven by the water stop plate to separate from water outlet hole and resume its initial status by the action of the spring, so as to assure the initial mode of outputting water from the faucet for every time of opening the faucet inlet valve. It is noteworthy that this reset process is completed automatically without requiring any manual operation.

In addition, a switching handle for driving the center bolt is switched by a back-and-forth swinging method, and the switching is not just operated by a user's hands only, but the switching also can be achieved by touching any part of the user's body.

DETAILED DESCRIPTION OF THE INVENTION

The technical characteristics and objectives of the present invention can be further understood by the following detailed description of preferred embodiments and related drawings.

Figure 1:
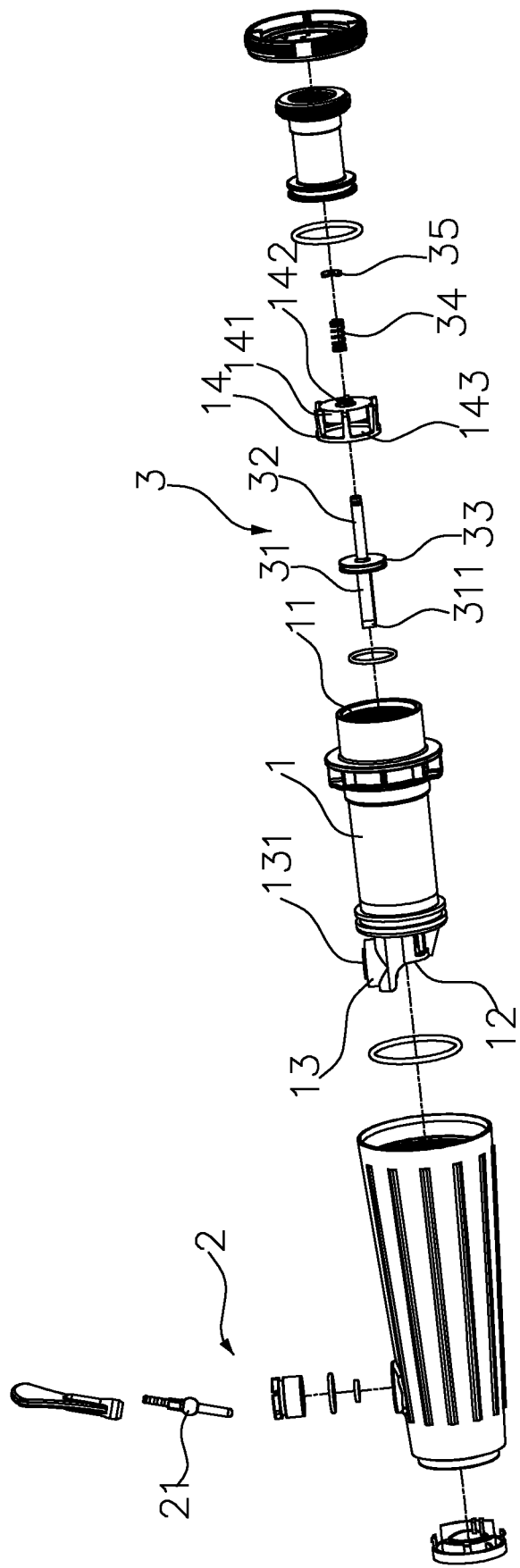
FIG. 1 is an exploded view of a first preferred embodiment of the present invention.
Figure 2:
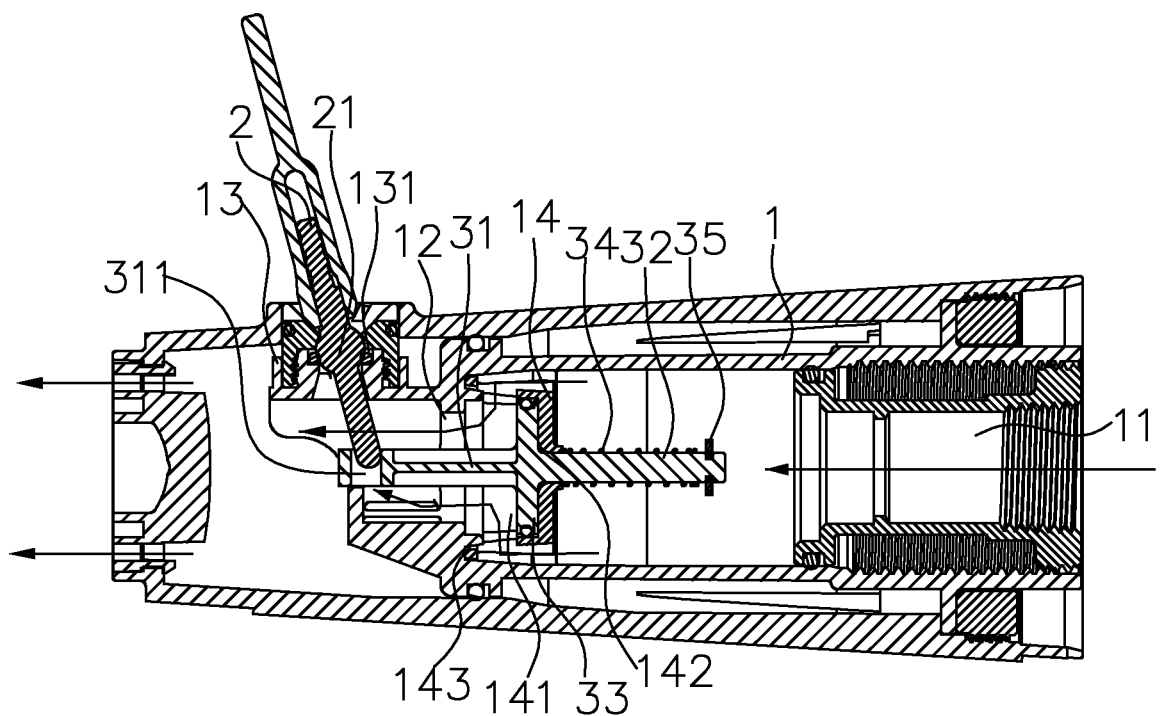
FIG. 2 is a sectional view of the first preferred embodiment of the present invention, showing a water running status of a faucet.
Figure 3:
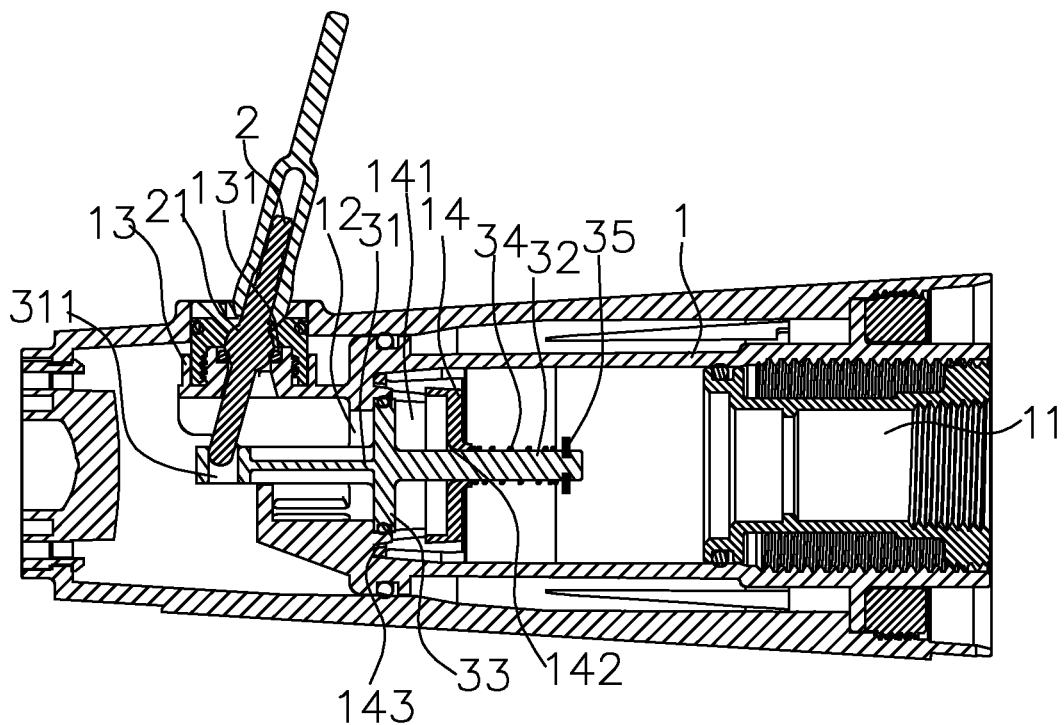
FIG. 3 is a sectional view of the first preferred embodiment of the present invention, showing a water stop status of a faucet.
Figure 4:
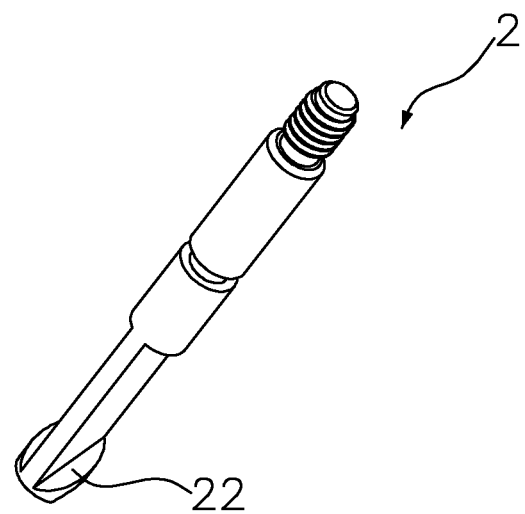
FIG. 4 is a schematic view of a switching lever of a second preferred embodiment of the present invention.
Figure 5:
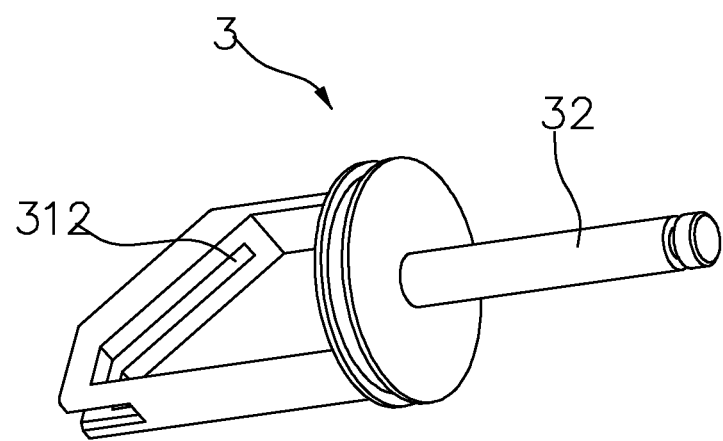
FIG. 5 is a schematic view of a center bolt of the second preferred embodiment of the present invention.

With reference to FIGS. 1 to 3 for a bathtub faucet water switching structure installed in a faucet body in accordance with a first preferred embodiment of the present invention, the bathtub faucet water switching structure comprises a water passage body 1, a switching lever 2 and a center bolt 3. The water passage body 1 is a hollow structure with both penetrating ends and includes a water inlet hole 11 communicated with a water source and a water outlet hole 12 communicated with a faucet spout, and the water passage body 1 has a fixing base 13 formed at the front end of the water outlet hole 12 for containing the switching lever 2, and the fixing base 13 has a mounting hole 131 formed at the middle of the fixing base 13. In addition, a fixing cover 14 is installed to the water outlet hole 12 and faces an opening of the water inlet hole 11, and an open receiving cavity 141 is formed at the middle of the fixing cover 14, and the opening of the receiving cavity 141 faces the water outlet hole 12. The receiving cavity 141 has a through hole 142 formed at the bottom of the receiving cavity 141 and a hollow portion 143 formed on a sidewall of the receiving cavity 141 and communicated with the receiving cavity 141.

The switching lever 2 is longitudinally installed in the fixing base 13 of the water passage body 1, and the switching lever 2 has a ball portion 21 formed thereon and rotatably contained within the mounting hole 131 of the fixing base 13, and an upper end of the switching lever 2 is protruded out of the fixing base 13 and the faucet body and coupled to a lever cover to facilitate the user's operation, and a lower end of the switching lever 2 is linked to the center bolt 3.

The center bolt 3 is transversally and movably installed to the water outlet 12 of the water passage body 1 to define a first shaft portion 31 and a second shaft portion 32, and a water stop plate 33 with a relatively large end surface is installed between the first shaft portion 31 and the second shaft portion 32, and the water stop plate 33 has an external diameter slightly greater than the diameter of the water outlet hole 12 of the water passage body 1. The first shaft portion 31 of the center bolt 3 is corresponsive to the lower end of the switching lever 2, and the first shaft portion 31 has a plug hole 311 formed thereon, and the lower end of the switching lever 2 is extended into the plug hole 311. The second shaft portion 32 of the center bolt 3 is extended into the receiving cavity 141 of the fixing cover 14 and protruded out of the through hole 142, and a spring 34 is sheathed on the shaft body of the second shaft portion 32, and an end of the shaft body of the second shaft portion 32 has a bracket 35 for fixing the spring 34. An end of the spring 34 is acted on the fixing cover 14, and the other end of the spring 34 is acted on the bracket 35. The center bolt 3 is moved horizontally back and forth in the water passage body 1 by the action of the switching lever 2 and the spring 34, and the water stop plate 33 and the water outlet hole 12 are driven to connect or disconnect a water path.

With reference to FIGS. 2-3 for the operating principle of the present invention, the center bolt 3 is moved backward by the spring 34 at the initial status, and the water stop plate 33 is separated from the water outlet hole 12 formed at the bottom of the receiving cavity 141 of the fixing cover 14, while the switching lever 2 is being driven by the center bolt 3 to swing counterclockwise by utilizing the ball portion 21 as a fulcrum. After the faucet inlet valve is opened, water enters from the water inlet hole 11 and flows out from the water outlet hole 12 through a hollow portion 143 formed on a sidewall of the fixing cover 14, wherein the default initial status is the status of outputting water from the faucet. When the water path is switched, the upper end of the switching lever 2 is turned to the right. Now, the lower end of the switching lever 2 drives the center bolt 3 to move forward, while compressing the spring 34 and driving the water stop plate 33 to seal the water outlet hole 12 and block the water path of the faucet, and the faucet is now situated at a water stop status. After the faucet inlet valve is shut, the static pressure inside the water passage body 1 drops slowly to a level smaller than the elastic restoring force of the spring 34, and the center bolt 3 is moved backward by the action of the spring 34, so that the water stop plate 33 of the center bolt 3 is separated from the water outlet hole 12 to resume the initial status, so as to assure the initial mode of outputting water from the faucet for every time of opening the faucet inlet valve.

Figure 6:
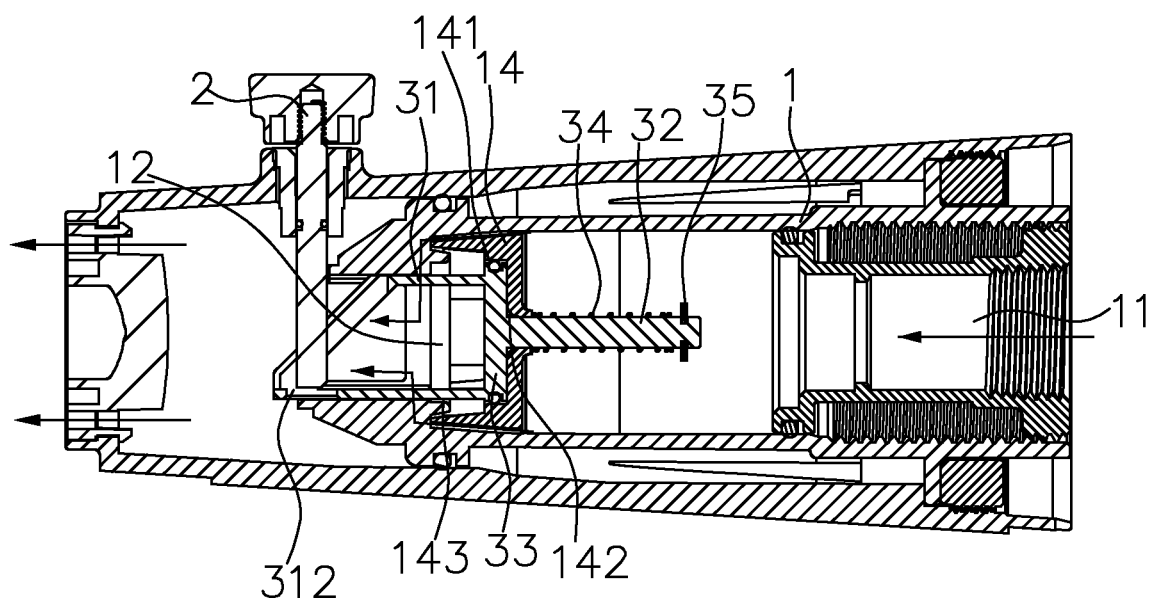
FIG. 6 is a sectional view of the second preferred embodiment of the present invention, showing a water running status of a faucet.
Figure 7:
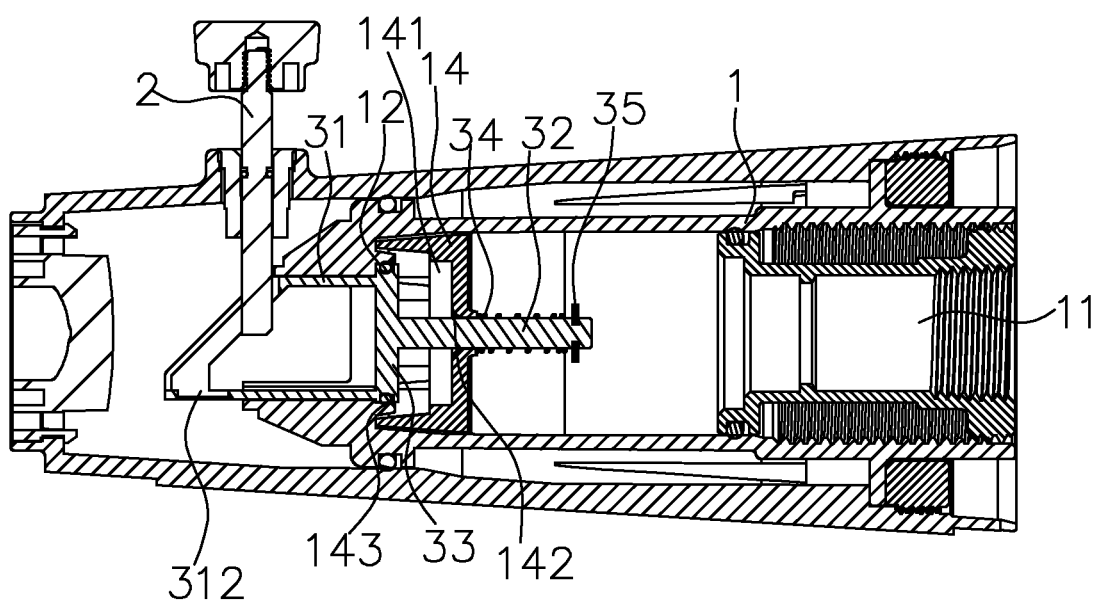
FIG. 7 is a sectional view of the second preferred embodiment of the present invention, showing a water stop status of a faucet.

With reference to FIGS. 4 to 7 for a bathtub faucet water switching structure in accordance with the second preferred embodiment of the present invention, the difference between this preferred embodiment and the first preferred embodiment resides on that the first shaft portion 31 of the center bolt 3 is a tilted slot 312, and the lower end of the switching lever 2 is extended into the tilted slot 312, and the switching lever 2 has a latch button 22 disposed at the lower end of the switching lever 2. With reference to FIGS. 6 and 7 for the operating principle, the center bolt 3 is moved backward by the action of the spring 34 in the initial status, and the water stop plate 33 is separated from the water outlet hole 12 formed at the bottom of the receiving cavity 141 of the fixing cover 14. Now, the switching lever 2 is situated at the bottom of the tilted slot 312. After the faucet inlet valve is opened, water enters from the water inlet hole 11 and passes through a hollow portion 143 disposed on a sidewall of the fixing cover 14, and then flows out from the water outlet hole 12. The default initial status is the status of outputting water from the faucet. When the water path is switched, the switching lever 2 is pulled out upwardly. Now, the latch button 22 at the lower end of the switching lever 2 and the tilted slot 312 jointly drive the center bolt 3 to move forward, while compressing the spring 34 to drive the water stop plate 33 to seal the water outlet hole 12 and disconnect the water path of the faucet. Now, the faucet is situated at a water stop status.

Figure 8:
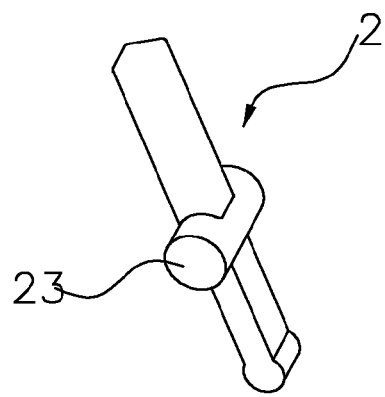
FIG. 8 is a schematic view of a switching lever of a third preferred embodiment of the present invention.

With reference to FIG. 8 for a bathtub faucet water switching structure in accordance with the third preferred embodiment of the present invention, the difference between this preferred embodiment and the first preferred embodiment resides on that a cylindrical body 23 at the middle of the switching lever 2 is used to substitute the assembly comprised of the ball portion 21 and the fixing base 13 of the first preferred embodiment, so as to achieve a better effect of limiting the switching lever 2 to move forward and backward only.

Figure 9:
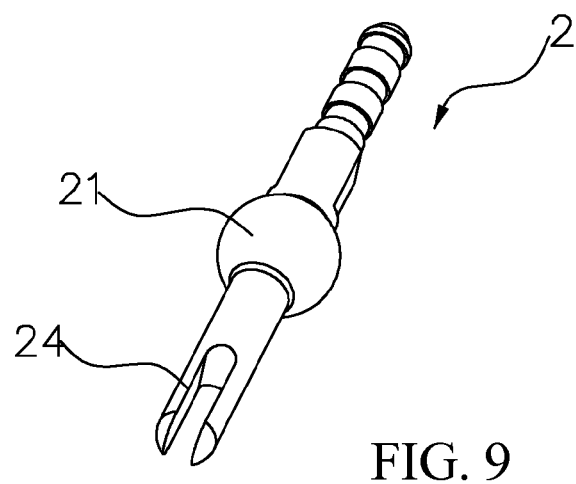
FIG. 9 is a schematic view of a switching lever of a fourth preferred embodiment of the present invention.
Figure 10:
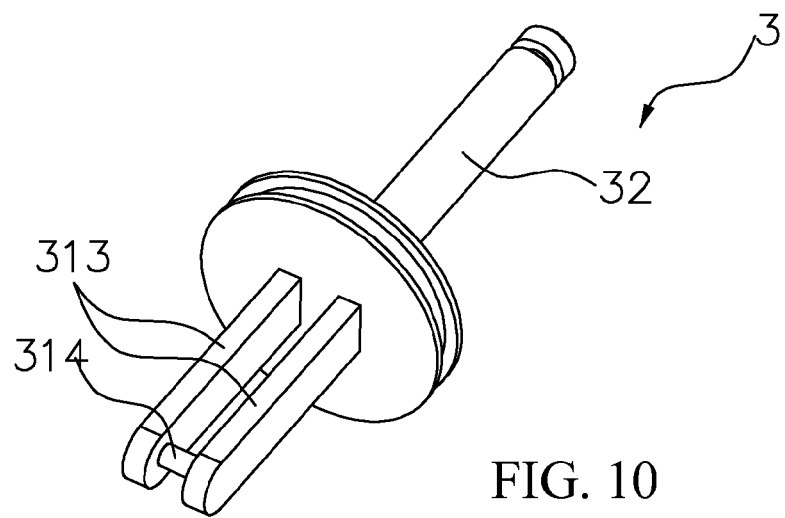
FIG. 10 is a schematic view of a center bolt of the fourth preferred embodiment of the present invention.

With reference to FIGS. 9 and 10 for a bathtub faucet water switching structure in accordance with the fourth preferred embodiment of the present invention, the difference between this preferred embodiment and the first preferred embodiment resides on that the first shaft portion 31 of the center bolt 3 adopts two separated level cantilevers 313, and a pivot 314 is installed between the two cantilevers 313, and the switching lever 2 has a fork 24 formed at the lower end of the switching lever 2 and corresponding to the pivot 314.

Compared with the prior art, the present invention has the following advantages and effects:

1. The center bolt of the present invention is transversally and movably installed (in the same direction of the water flow) on the water outlet of the water passage body of the faucet, and the center bolt can be moved horizontally back and forth in the water passage body by the action of the switching lever and the spring to drive the water stop plate of the center bolt and the water outlet hole to connect or disconnect the water path, and such structure has a good sealing effect for preventing leakage, so that the water paths can be switched more definitely.
2. After the faucet inlet valve is shut, the center bolt drives the water stop plate to separate from the water outlet hole automatically to resume the initial status by the action of the spring, so as to assure the initial mode of outputting water from the faucet for every time of opening the faucet inlet valve, and such reset process is completed automatically without requiring any manual operation.
3. The switching handle for driving the center bolt is switched by a back-and-forth swinging method, and the switching is not just operated by a user's hands only, but the switching also can be achieved by touching any part of the user's body.

What is claimed is:

1. A bathtub faucet water switching structure, installed in a faucet body, comprising: a water passage body, a switching lever and a center bolt, characterized in that the water passage body is a hollow structure with both penetrating ends and has a water inlet hole and a water outlet hole; the switching lever is longitudinally installed at the front end of the water passage body and has an upper end protruded out of the faucet body and a lower end linked with the center bolt; and the center bolt is transversally and movably installed to the water outlet of water passage body and has a first shaft portion and a second shaft portion, and a water stop plate is installed between the first shaft portion and the second shaft portion, and the first shaft portion of the center bolt is corresponsive to the lower end of switching lever, and a spring is sheathed on the shaft body of the second shaft portion, and the center bolt is moved back and forth horizontally in the water passage body by the action of the switching lever and the spring to drive the water stop plate and the water outlet hole to connect or disconnect a water path,
wherein the water stop plate is driven to connect the water path when the spring is at an initial status, and the water stop plate is driven to disconnect the water path when the spring at a compressed status.

2. The bathtub faucet water switching structure of claim 1, wherein the water passage body includes a fixing based formed at the front end of the water passage body for receiving the switching lever, and a mounting hole is formed at the middle of the fixing base, and a ball portion is formed on the switching lever and rotatably contained within the mounting hole.

3. The bathtub faucet water switching structure of claim 1, wherein the water passage body includes a fixing cover mounted onto an opening of the water outlet hole, and the fixing cover has an open receiving cavity formed at the middle of the fixing cover and facing the water outlet hole, and the receiving cavity has a through hole formed on a sidewall of the receiving cavity and communicated with a hollow portion of the receiving cavity, and the second shaft portion of the center bolt is extended into the receiving cavity of the fixing cover and protruded out of the through hole.

4. The bathtub faucet water switching structure of claim 1, wherein the first shaft portion the center bolt has a plug hole formed thereon, and the lower end of the switching lever is extended into the plug hole.

5. The bathtub faucet water switching structure of claim 1, wherein the second shaft portion of the center bolt has a bracket for fixing the spring.

6. The bathtub faucet water switching structure of claim 1, wherein the switching lever includes a cylindrical body formed thereon and contained in a mounting hole of a fixing base of the water passage body.

7. A bathtub faucet water switching structure, installed in a faucet body, comprising: a water passage body, a switching lever and a center bolt, characterized in that the water passage body is a hollow structure with both penetrating ends and has a water inlet hole and a water outlet hole; the switching lever is longitudinally installed at the front end of the water passage body and has an upper end protruded out of the faucet body and a lower end linked with the center bolt; and the center bolt is transversally and movably installed to the water outlet of water passage body and has a first shaft portion and a second shaft portion, and a water stop plate is installed between the first shaft portion and the second shaft portion, and the first shaft portion of the center bolt is corresponsive to the lower end of switching lever, and a spring is sheathed on the shaft body of the second shaft portion, and the center bolt is moved back and forth horizontally in the water passage body by the action of the switching lever and the spring to drive the water stop plate and the water outlet hole to connect or disconnect a water path,
wherein the first shaft portion of center bolt is a tilted slot, and the lower end of the switching lever is extended into the tilted slot, and the lower end of the switching lever has a latch button.

8. A bathtub faucet water switching structure, installed in a faucet body, comprising: a water passage body, a switching lever and a center bolt, characterized in that the water passage body is a hollow structure with both penetrating ends and has a water inlet hole and a water outlet hole; the switching lever is longitudinally installed at the front end of the water passage body and has an upper end protruded out of the faucet body and a lower end linked with the center bolt; and the center bolt is transversally and movably installed to the water outlet of water passage body and has a first shaft portion and a second shaft portion, and a water stop plate is installed between the first shaft portion and the second shaft portion, and the first shaft portion of the center bolt is corresponsive to the lower end of switching lever, and a spring is sheathed on the shaft body of the second shaft portion, and the center bolt is moved back and forth horizontally in the water passage body by the action of the switching lever and the spring to drive the water stop plate and the water outlet hole to connect or disconnect a water path, wherein the first shaft portion of the center bolt includes two separating level cantilevers, and a pivot is installed between the two cantilevers, and the lower end of the switching lever has a fork corresponding to the pivot.

* * * * *